Figure 2:
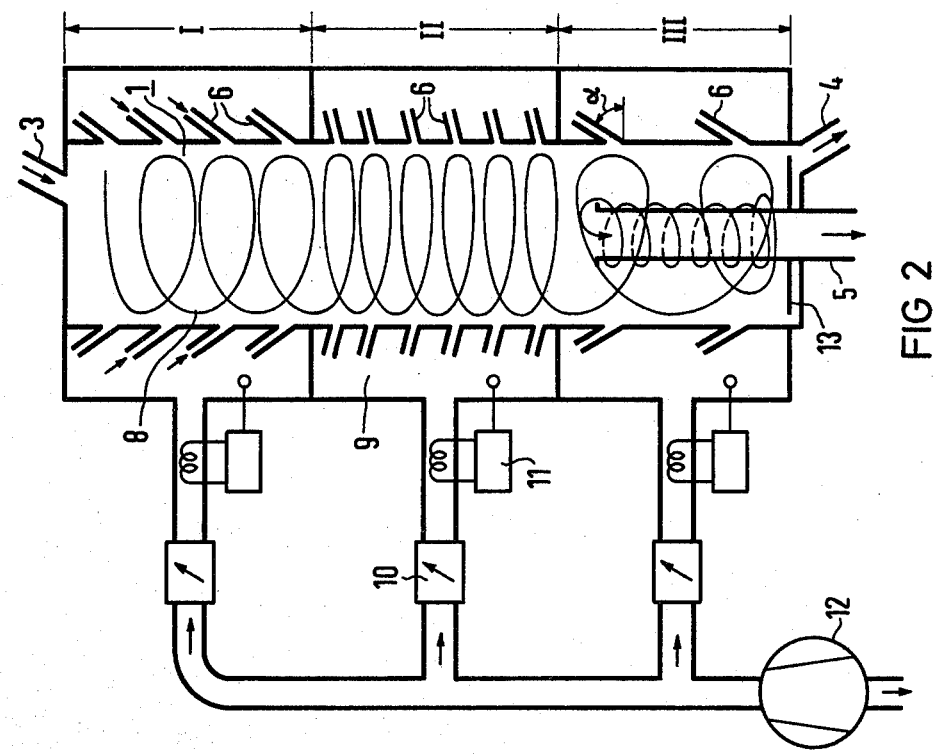

United States Patent [19]

Klein et al.

[11] 4,454,661
[45] Jun. 19, 1984

[54] TORNADO FLOW SEPARATOR FOR THE THERMAL TREATMENT OF FINE-GRAIN OR GRANULAR MATERIAL

[75] Inventors: Heinrich Klein; Rudolf Pieper, both of Erlangen; Eduard Weber, Nuremberg, all of Fed. Rep. of Germany

[73] Assignee: Kraftwerk Union Aktiengesellschaft, Mulheim an der Ruhr, Fed. Rep. of Germany

[21] Appl. No.: 353,881

[22] Filed: Mar. 2, 1982

[30] Foreign Application Priority Data

Mar. 9, 1981 [DE] Fed. Rep. of Germany ....... 3108875

[51] Int. Cl.$^3$ ............................................. F26B 17/10
[52] U.S. Cl. ..................................... 34/57 E; 34/168; 55/447
[58] Field of Search ............. 34/10, 57 B, 57 E, 57 R, 34/168, 171, 182; 55/261, 447; 209/11, 44.2, 144

[56] References Cited

U.S. PATENT DOCUMENTS

| | | |
|---|---|---|
| 3,600,817 | 8/1971 | Klein . |
| 3,768,172 | 10/1973 | Klein et al. ........................ 34/57 E |
| 3,851,404 | 12/1974 | Fracke et al. ...................... 34/57 E |

Primary Examiner—Larry I. Schwartz
Assistant Examiner—David W. Westphal
Attorney, Agent, or Firm—Herbert L. Lerner; Laurence A. Greenberg

[57] ABSTRACT

Tornado flow separator for the thermal treatment of fine-grain or granular material with at least one gaseous medium, including a cylindrical reaction chamber having a surface, two ends and at least first, second and third treatment zones of substantially equal length through which the material passes after given dwelling time, tangential feeding means for the gaseous media being disposed in the surface of the reaction chamber in the treatment zones for setting the dwelling time of the material in the third treatment zone to be at least twice as long as the dwelling time in each of the first and second treatment zones, at least one inclined tangential material feed disposed in vicinity of one of the ends of the reaction chamber, at least one outlet for treatment material disposed in vicinity of the others of the ends of the reaction chamber, and an exhaust pipe for at least one of excess and spent gaseous media being axially extended into the reaction chamber from along side the material outlet and having a free opening in vicinity of the third treatment zone.

8 Claims, 2 Drawing Figures

TORNADO FLOW SEPARATOR FOR THE THERMAL TREATMENT OF FINE-GRAIN OR GRANULAR MATERIAL

The invention relates to a tornado flow separator for the thermal treatment of fine-grain or granular material with at least one gaseous medium, including a cylindrical reaction chamber having at least three treatment zones of approximately equal length, tangential inlets for the gaseous media in the cylindrical reaction chamber surface, at least one obliquely tangential material feed in the region of one end face of the reaction chamber, at least one outlet for the treated material in the region of the other end face of the reaction chamber, as well as an axial exhaust pipe protruding into the reaction chamber for the excess and/or spent gaseous media.

With respect to the device described above, reference is made to tornado flow separators such as are described in further detail, for instance, in German Published Non-Prosecuted Application DE-OS 21 38 165 corresponding to U.S. Pat. No. 3,768,172.

One embodiment described in the references is in the form of a so-called helical flow dryer, in which the tangential nozzles in the reaction chamber surface are inclined at an angle downward and are disposed along a helical path on the circumference of the chamber surface. In this way the material introduced at the upper end of the chamber is collected on a helical path in the vicinity of the chamber wall and is conducted downward. In a second embodiment, the so-called ringflow dryer, the nozzles are disposed tangentially in planes which are perpendicular to the axis of the tornado flow separator. The introduced material is collected in this case in annular, floatingly rotating accumulations each being disposed between two rows of nozzles. By controlling the air through the nozzles or by overloading the individual rings, these rings travel and jump downward and are likewise thermally treated in this manner, such as by drying.

With constant axial transport velocity of the treated material, the dwelling time in the reaction chamber is essentially determined by the length of the chamber, through which the gaseous materials are fed in. For the quantity of the material to be treated in one pass through the reaction chamber, however, the ratio of the charged-in quantity to the volume throughput of a gaseous media must in addition also be observed.

It has heretofore been customary in this connection to exhaust excess and already spent amounts of gas through an exhaust in an end face of the reaction chamber (as seen, for instance, in U.S. Pat. No. 3,600,817). In the case of large quantities of exhaust which require an increased exhaust velocity of the gas, this however, results in changes of the flow within the reaction chamber, so that reliable guidance of the particle rings or the particle helix is not always ensured.

In the device according to German Published Non-Prosecuted Application DE-OS 21 38 165 and U.S. Pat. No. 3,768,172, changes in the flow are supposed to be avoided by the provision of the exhaust being constructed as an exhaust pipe which protrudes at least through one-half of the reaction chamber and is provided with additional suction openings distributed over its length.

Due to the multiplicity of the suction openings, however, air short circuits coming about within the reaction chamber cannot always be avoided, so that the throughput of gas may be substantially larger than would be properly required, for instance for drying. This is also undesirable for energy reasons.

It is accordingly an object of the invention to provide a tornado flow separator for the thermal treatment of fine-grain or granular material, which overcomes the hereinafore-mentioned disadvantages of the heretofore-known devices of this general type, and which does so in such a manner that short circuits within the reaction chamber are avoided and the energy consumption is optimized.

With the foregoing and other objects in view there is provided, in accordance with the invention, a tornado flow separator for the thermal treatment of fine-grain or granular material with at least one gaseous medium, comprising a cylindrical reaction chamber having a surface, two ends and at least first, second and third treatment zones of approximately or substantially equal length through which the material passes after given dwelling times, tangential inlets or feeding means for the gaseous media being disposed in the surface of the reaction chamber in the treatment zones, and differently at the first and second treatment zones as opposed to the third treatment zone for setting the dwelling time of the material in the third treatment zone to be at least twice as long as the dwelling time in each of the first and second treatment zones, at least one oblique or inclined tangential material feed disposed in vicinity of one of the ends of the reaction chamber, at least one outlet for treated material disposed in vicinity of the other of the ends of the reaction chamber, and an exhaust pipe for at least one of excess and spent gaseous media being axially extended into the reaction chamber from along side the material outlet and having a free opening in vicinity of the third treatment zone.

In accordance with another feature of the invention, the tangential feeding-means in the first and second treatment zones are identical and the feeding means are different in the third treatment zone as compared to the first and second treatment zones.

In accordance with a further feature of the invention, the first treatment zone is disposed at the one end of the reaction chamber following the material feed, the second treatment zone is disposed at the other end of the reaction chamber preceding the outlet, the third treatment zone is intermediate the first and second zones, and the free opening of the exhaust pipe is disposed substantially or approximately at an end of the third treatment zone closest to the outlet. In other words the tangential inlets in the first treatment zone following the material input and in the treatment zone preceding the outlet are arranged with respect to the feeds in the intermediate treatment zone in such a manner that the dwelling time in the intermediate treatment zone is at least twice as long as the dwelling time in the first or last treatment zone.

Since the increase of the dwelling time accomplished through the construction of the tangential gas feeds in a given zone of the reaction chamber leads to a very stable wall flow in this zone, the exhaust pipe can in this case open centrally without the occurrence of gas short circuits.

Graduating the dwelling time in the three approximately equally long reaction chamber zones simultaneously also leads to optimal adaptation to the usually required thermal treatment processes, such as drying. Thus, in the first zone, for instance, fast heating-up is achieved; in the zone with longer dwelling time, the moisture is driven to the surface; and in the last zone, the remaining drying is performed. The desired different dwelling times in the individual zones can be obtained with a relatively simple mechanical construction, if in accordance with an added feature of the invention, the tangential feeding means includes a different amount of feeding devices and/or feeding devices disposed at different angles with respct to the reaction chamber at the third treatment zone as opposed to the first and second treatment zones.

In accordance with an additional feature of the invention, the third treatment zone is intermediate the first and second treatment zones.

In accordance with yet another feature of the invention, there are provided means for feeding in gaseous media at different temperatures and/or in different compositions to the treatment zones individually, in order to obtain optimum matching, to a drying process, for example.

In accordance with yet a further feature of the invention, there are provided means for controlling the temperature of the surface of the reaction chamber.

In the interest of good heat transfer, it is of advantage here if the operation is carried out according to the counterflow principle, i.e. the temperature change of the fed-in media in the longitudinal direction of the reaction chamber is the reverse of the temperature change of the treated material.

Therefore, in accordance with a concomitant feature of the invention, the treated material changes temperature as it passes through the reaction chamber, and the means for feeding in gaseous media at different temperatures changes the temperature of the gaseous media being fed in to be in reverse of the temperature change of the treated material as it passes through the reaction chamber.

Thermal treatment is understood in the present case to not only refer to drying, but to cooling as well. The use of the above-described tornado flow separator as a cooling device within the framework of a technological process, such as the cooling of a powder to a permissible packing temperature, provides very considerable savings of the overall length required as compared to the state of the art, with fall shafts.

Other features which are considered as characteristic for the the invention are set forth in the appended claims.

Although the invention is illustrated and described herein as embodied in a tornado flow separator for the thermal treatment of fine-grain or granular material, it is nevertheless not intended to be limited to the details shown, since various modifications and structural changes may be made therein without departing from the spirit of the invention and within the scope and range of equivalents of the claims.

Figure 1:
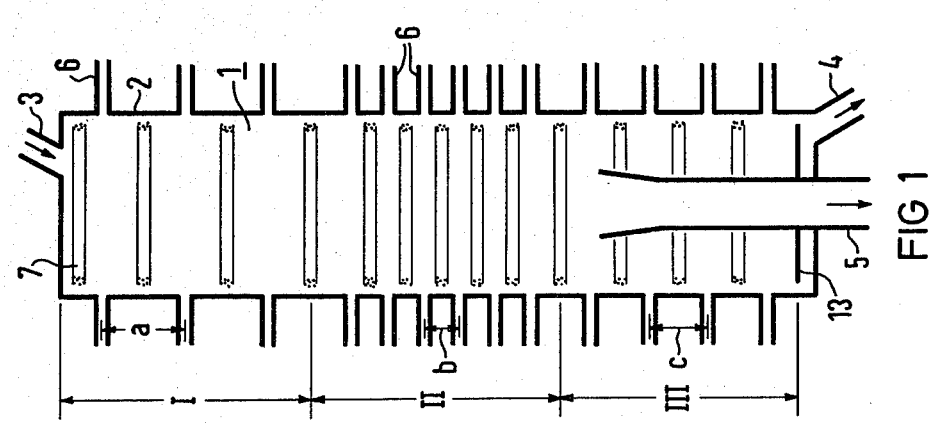

The construction and method of operation of the invention, however, together with additional objects and advantages thereof will be best understood from the following description of specific embodiments when read in connection with the accompanying drawings, in which:

FIG. 1 is a diagrammatic front elevational view of a ring-flow dryer with an exhaust pipe; and FIG. 2 is a schematic and diagrammatic front elevational view of a helical-flow dryer with an exhaust pipe.

Referring now to the figures of the drawing and first particularly to FIG. 1 thereof, it is seen that the tornado flow separator includes a cylindrical reaction chamber 1 with nozzles 6 in the chamber surface 2, the nozzles being disposed in planes which are perpendicular to the axis of the reaction chamber 1. A gaseous medium for treating or drying the material is introduced through the nozzles. The fine-grain or granular material is transported into the reaction chamber 1 through an inclined tangential material inlet 3. The inflowing material is collected through the action of the flow formed in the reaction chamber 1 in floatingly rotating particle rings 7 each being disposed between two individual rows of nozzles 6. By shutting off individual rows of nozzles, the particle ring above the row of nozzles which has been shut off then falls further downward into the next-following ring zone. After passing through the entire reaction chamber, the treated material leaves the reaction chamber through an outlet 4 at the bottom thereof. Protruding into the reaction chamber 1 is a central axial exhaust pipe 5 which extends through approximately ⅔ of the length of the reaction chamber 1, i.e. it ends approximately at the end of an intermediate zone II, beginning from below. The reaction chamber 1 of the tornado flow separator is divided into three zones having approximately equal length but different dwelling time of the material; specifically, the reaction chamber 1 is divided into a first treatment zone I with a relatively wide spacing "a" of the rows of nozzles from each other; a following intermediate zone II with a relatively narrow spacing "b" of the rows of nozzles, and a post-treatment zone III again having a relatively large spacing "c" of the rows of nozzles from each other. Therefore, the dwelling time can be adjusted, for instance, in such a manner that the dwelling time in the intermediate zone II is about three to four times as long as that in the zones I or III. Through such a construction of the individual zones, the dwelling time can be adapted very favorably to the respective technological requirements. For instance, in a drying process, in the zone I drying is performed relatively rapidly; in the zone II the moisture is driven out of the material; and in the zone III the remaining drying is performed.

Since the flow at the end of the zone II in the vicinity of the wall is rather stable, the exhaust pipe 5 for the excess gases which opens there does not disturb the material transport proper. What is being drawn off is substantially only the spent gas medium which is separated at the bottom of the reaction chamber 1 from the material, flows upward in the exhaust pipe 1 and is drawn off into the opening.

In FIG. 2, an apparatus similar to that illustrated in FIG. 1 is shown, but one involving a so-called helical-flow dryer. While the nozzles 6 are disposed tangentially with reespect to the wall of the reaction chamber, they are not perpendicular and are rather inclined downward at an angle to the axis of the chamber and on a helical path at the circumference of the chamber surface 2. A value between 15 and 45° is advisable as the angle of inclination. In this way, the material entering through the feed 3 is continuously conducted on a helical path within the reaction chamber 1. The material, such as dried material, then leaves the reaction chamber through the exit 4, while the gas added through the nozzles 6 is moved substantially upwardly in an internal flow and is drawn off through the opening of the exhaust pipe 5. In this case as well, the length of the exhaust pipe 5 is approximately ⅔ of the overall length of the reaction chamber 1 and the pipe opens at the end of the intermediate zone II. This is because similar to the previous embodiment according to FIG. 1, the reaction chamber is also sub-divided in this embodiment into three treatment zones I, II and III which, while of approximately the same length, differ as to the dwelling time of the material. This is achieved by the provision that in the zones I and III, the slope of the nozzles, i.e. the angle α of inclination, is chosen to be larger than in the region II, so that a longer dwelling time results in this region due to the flatter helix. In this manner, an optimum adaptation to technological processes is also possible in this case. Furthermore, air short circuits are also largely prevented by the suction process described here, since the wall flow at the end of the zone II is extremely stable because the angle of inclination is relatively small due to the large number of nozzles.

In order to assure that gases of different temperature and/or composition are able to be admitted to the individual zones, the nozzles 6 in the individual zones I to III are each fed from separate gas feed chambers 9, which are in turn optionally connected to a gas source 12 through pressure control organs 10. This gas source 12 can in turn wholly or partially take up the amount of gas exhausted through the exhaust pipe 5. In order to allow for any desired temperature of the fed-in gases to be adjusted in the different zones, associated with each chamber 9 is a temperature control device 11 which delivers a corresponding amount of heating power to the gases flowing into the gas feed chambers 9, in accordance with the actual temperature value. Advantageously, the assignment of the temperature to the individual zones is carried out in such a way that the drying takes place according to the counterflow method.

It may also be advantageous to place a baffle 13 above the material outlet 4 at the bottom of the reaction chamber 1. The baffle 13 serves for shielding the outlet 4 in the air flow within the reaction chamber 1, so that essentially only treated material is removed through this outlet 4 and not additional gas volume.

In the drawings, a reaction chamber with a material feed at the upper end and a material discharge at the lower end is shown. However, it is also possible to operate the reaction chamber in a horizontal position.

On accasion, it may be of advantage to interchange the sequence of the three treatment zones of approximately equal length, if the drying process so requires; furthermore, in such a case the exhaust pipe should open approximately in the region of the zone with the longest dwelling time of the material, since the most stable flow is found there.

There are claimed:

1. Tornado flow separator for the thermal treatment of fine-grain or granular material with at least one gaseous medium, comprising a cylindrical reaction chamber having a surface, two ends and at least first, second and third treatment zones of substantially equal length through which the material passes after given dwelling times, tangential feeding means for the gaseous media being disposed in said surface of said reaction chamber in said treatment zones for setting said dwelling time of the material in said third threatment zone to be at least twice as long as said dwelling time in each of said first and second treatment zones, at least one inclined tangential material feed disposed in vicinity of one of said ends of said reaction chamber, at least one outlet for treated material disposed in vicnity of the other of said ends of said reaction chamber, and an exhaust pipe for at least one of excess and spent gaseous media being axially extended into said reaction chamber from along side said material outlet and having a free opening in vicinity of said third treatment zone, said first treatment zone being disposed at the one end of said reaction chamber following said material feed, said second treatment zone being disposed at the other end of said reaction chamber preceding said outlet, said third treatment zone being intermediate said first and second zones, and said free opening of said exhaust pipe being disposed substantially at an end of said third treatment zone closest to said outlet.

2. Tornado flow separator according to claim 1, wherein said tangential feeding means in said first and second treatment zones are identical and said feeding means are different in said third treatment zone as compared to said first and second treatment zones.

3. Tornado flow separator according to claim 1, wherein said tangential feeding means includes a different amount of feeding devices at said third treatment zone as opposed to said first and second treatment zones.

4. Tornado flow separator according to claim 1, wherein said tangential feeding means includes feeding devices disposed at different angles with respect to said reaction chamber at said third treatment zone as opposed to said first and second treatment zones.

5. Tornado flow separator according to claim 1, including means for feeding in gaseous media at different temperatures to said treatment zones individually.

6. Tornado flow separator according to claim 5, wherein the treated material changes temperature as it passes through said reaction chamber, and said means for feeding in gaseous media at different temperatures changes the temperature of the gaseous media being fed in to be in reverse of the temperature change of the treated material as it passes through said reaction chamber.

7. Tornado flow separator according to claim 1, including means for feeding in gaseous media in different compositions to said treatment zones individually.

8. Tornado flow separator according to claim 5 or 7, including means for controlling the temperature of said reaction chamber.

* * * * *